UNITED STATES PATENT OFFICE.

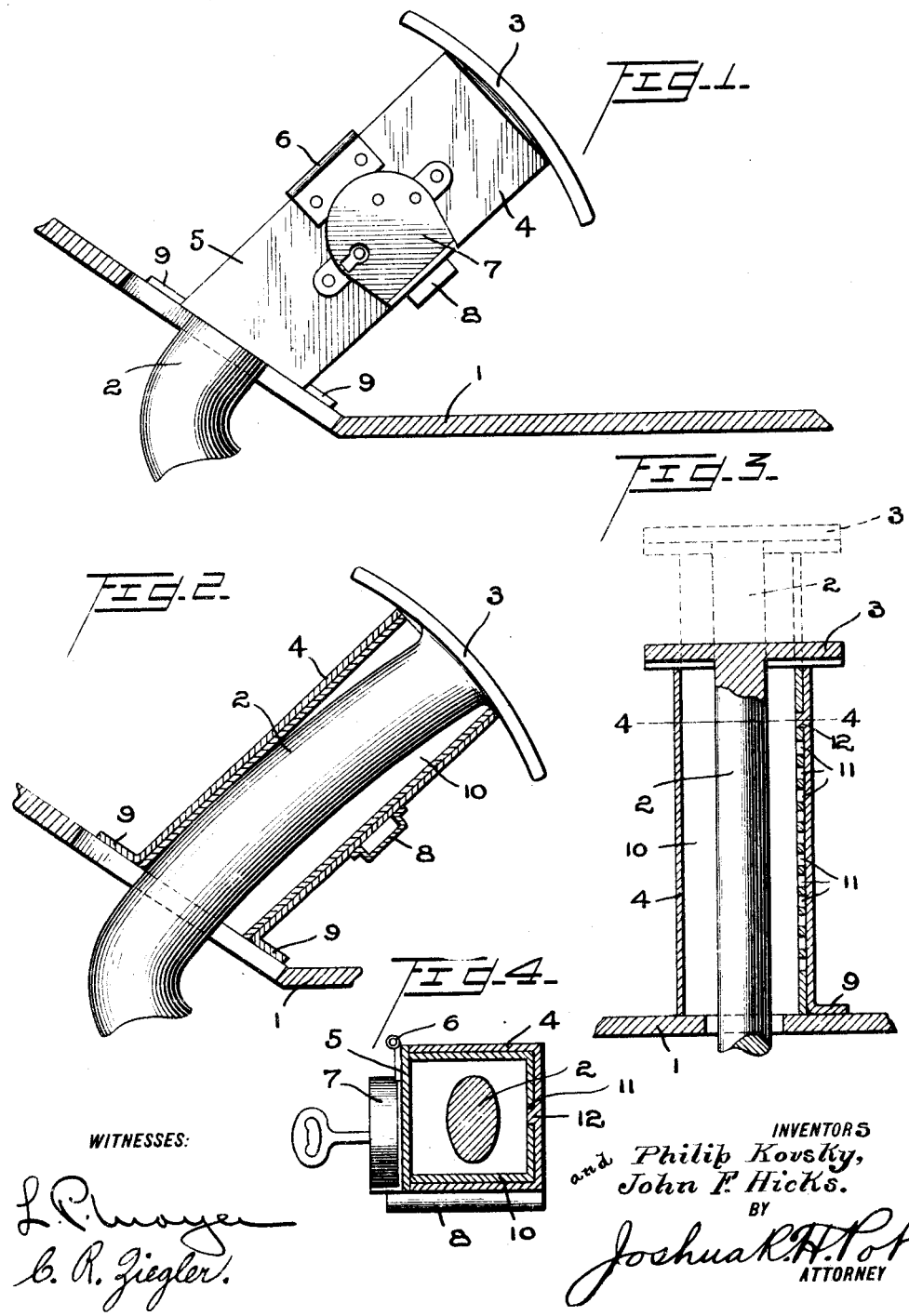

PHILIP KOVSKY AND JOHN F. HICKS, OF PHILADELPHIA, PENNSYLVANIA.

AUTOMOBILE-LOCK.

1,071,756.　　　　　Specification of Letters Patent.　　Patented Sept. 2, 1913.

Application filed May 3, 1913. Serial No. 765,198.

*To all whom it may concern:*

Be it known that we, PHILIP KOVSKY and JOHN F. HICKS, citizens of the United States, residing at Philadelphia, county of Philadelphia, and State of Pennsylvania, have invented certain new and useful Improvements in Automobile-Locks, of which the following is a specification.

Our invention relates to improvements in automobile locks, the object of the invention being to provide a simple inexpensive yet efficient lock which prevents the operation of the clutch, and which may be quickly applied and removed.

A further object is to provide a device of this character which is capable of adjustment so as to be operative in connection with various styles of clutch lever.

With these and other objects in view, the invention consists in certain novel features of construction and combinations and arrangements of parts as will be more fully hereinafter described and pointed out in the claims.

In the accompanying drawings: Figure 1 is a view in side elevation illustrating our improvements in operative position. Fig. 2 is a view in longitudinal section. Fig. 3 is a view in longitudinal section at right angles to Fig. 2, and Fig. 4 is a view in cross section on the line 4—4 of Fig. 3.

1 represents an automobile and 2 the clutch lever thereof having an enlarged treadle 3 at its free end, so that the operator may have a convenient resting place for the foot to readily depress the lever and operate the clutch.

This invention, of course, is not limited to any particular form of clutch lever, but is adapted for use in connection with any ordinary form in general use.

To lock the clutch lever 2 against movement, we provide a rectangular casing 4 having a door 5 at one side connected by a hinge 6 and provided with a lock 7, the bolt of which is adapted to enter a keeper 8 fixed to the side wall of the casing. This casing 4, at its lower edge, is provided with a flange 9 to rest against the platform of the automobile, and such flange and the lower edge of the casing is inclined to conform to the shape of the platform. It is to be understood, of course, that the casing is approximately the length of the clutch lever above the platform, so that it fits under the treadle 3 and prevents the latter from being depressed. Inside of casing 4, a channel 10 is located and is provided with a longitudinal series of openings 11 to receive in any of them a fixed stud 12 in casing 4. This channel is of substantially the same external dimension as the internal dimension of the casing, so that when it is adjusted longitudinally relative to the casing and the stud 12 located in one of the openings 11, it cannot move longitudinally when the door 5 is closed and locked. This channel therefore permits of longitudinal adjustment of the device to accommodate the same to various lengths of clutch lever.

In operation, when the driver leaves his car, it is simply necessary for him to open the door 5, place the casing around the clutch lever, and then lock the door.

The invention is of course not limited to any particular style of lock, as we may use various forms of lock, and various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A device of the character described, comprising a lever engaging device consisting of two members movable relative to each other, whereby the length of the device may be varied, and means for locking said device around a lever, substantially as described.

2. A device of the character described, comprising a casing adapted to be positioned around a lever, a door closing said casing, and a channel bar adjustable longitudinally in the casing, substantially as described.

3. A device of the character described, comprising a rectangular casing open at one side, a door hinged to the open side of the casing, a lock on the door, a keeper on the casing to receive the bolt of said lock, and a channel bar adjustable longitudinally in the casing, substantially as described.

4. A device of the character described, comprising a casing adapted to be positioned around a lever, a door closing said casing, a channel bar adjustable longitudinally in the casing, said channel bar conforming in shape and fitting within the casing and having a longitudinal series of openings therein, and a stud in said casing adapted to enter in said openings, substantially as described.

In testimony whereof we have signed our names to this specification in the presence of two subscribing witnesses.

PHILIP KOVSKY.
JOHN F. HICKS.

Witnesses:
C. R. ZIEGLER,
S. W. FOSTER.